April 13, 1937.                J. W. KAYSER                 2,076,995
                                FARM GATE
                         Filed April 18, 1936         2 Sheets-Sheet 1
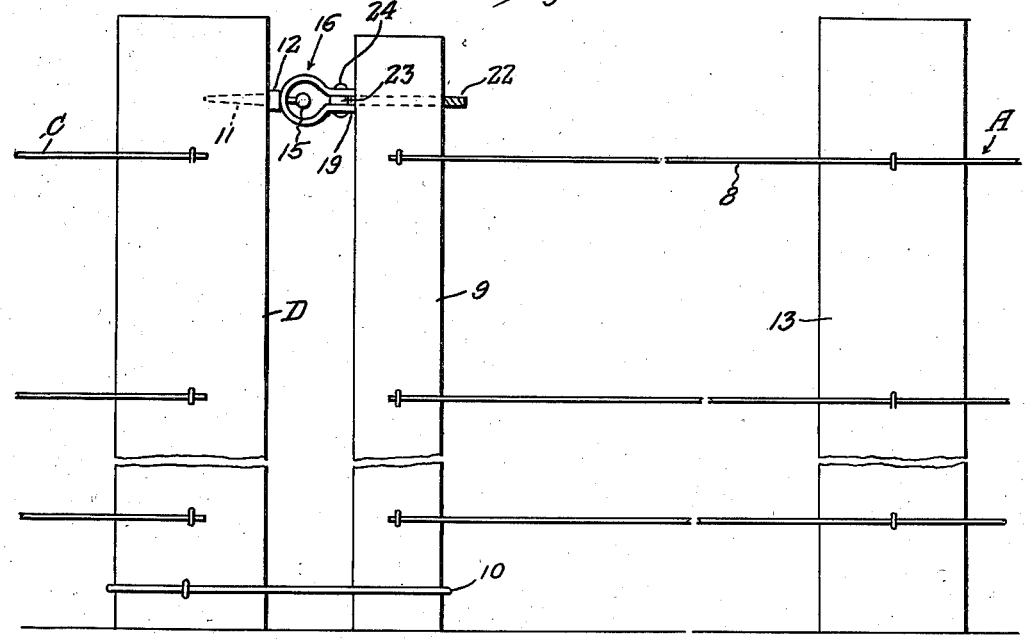
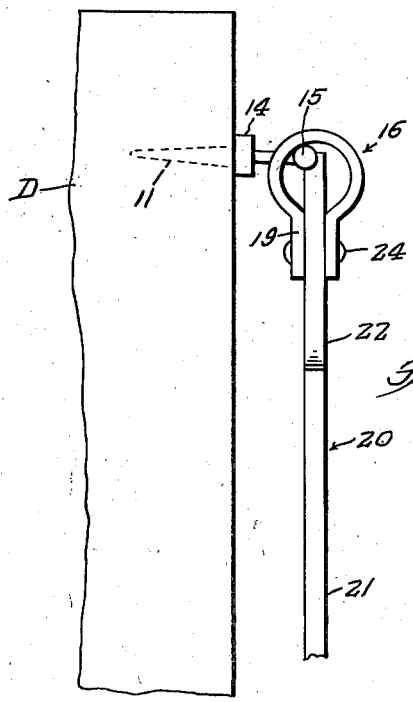
Inventor
James W. Kayser.

April 13, 1937.  J. W. KAYSER  2,076,995
FARM GATE
Filed April 18, 1936    2 Sheets-Sheet 2
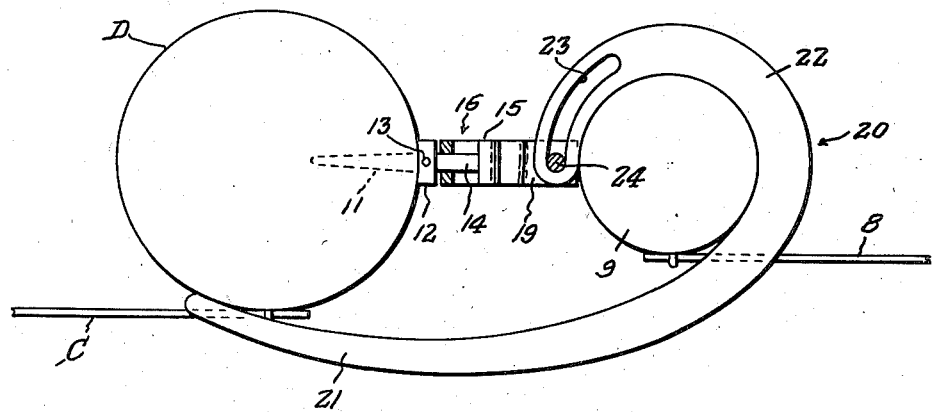
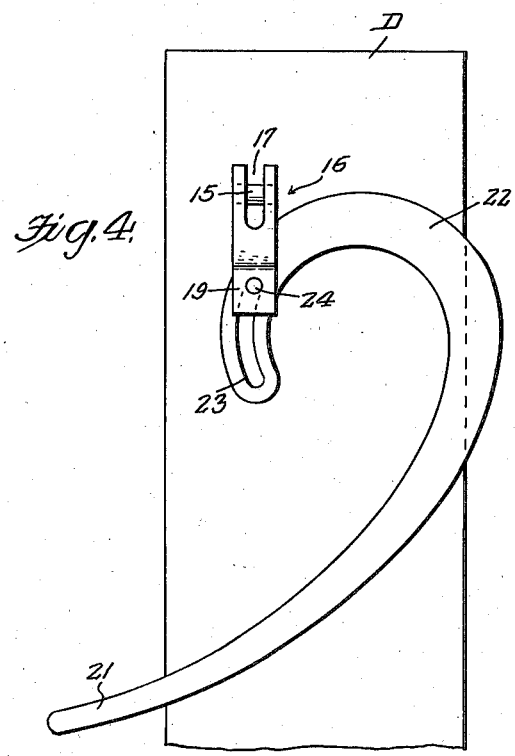
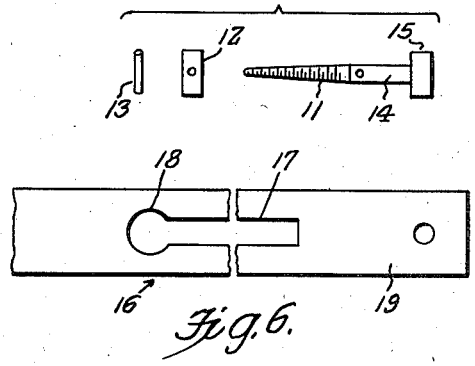
Inventor
James W. Kayser.

Patented Apr. 13, 1937

2,076,995

UNITED STATES PATENT OFFICE 2,076,995

FARM GATE

James W. Kayser, Riverton, Wyo., assignor of one-fourth to J. W. Lavery and one-fourth to William S. Neill, both of Riverton, Wyo.

Application April 18, 1936, Serial No. 75,185

6 Claims. (Cl. 39—74)

The present invention relates to that class of fence and gate structures quite frequently referred to as of the barbed wire construction and has reference in particular to the variety of gates which has become to be known as farm and ranch gates.

As can be appreciated by those familiar with wire fence and gate construction, the requirements are such as not to necessitate the employment of elaborate and expensive gates. Under the circumstances, I have evolved and carefully worked out an unusually simple, inexpensive and expeditiously usable gate which is susceptible of being installed between adjacent relatively fixed fence posts in a barbed wire construction. That is to say, I have found it expedient and practicable to simply fasten a gate-forming, bodily swingable post to the free ends of the fence wires and to coordinate this with one of the aforementioned fence posts to provide an effective and satisfactorily usable home-style arrangement.

Novelty is therefore thought to reside in the foregoing simplified, easily operable gate, but especially in the coacting means between the gate post and the adjacent fence post to permit the gate post to be locked closed or readily lifted and swung open in a feasible and dependable manner.

Other features and advantages, particularly those relating to the gate retention means, will become more readily apparent from the following description and the accompanying illustrative drawings.

In the drawings:

Figure 1 is a view showing portions of the fence construction and the associated gate construction, the gate being retained closed by the improved holding or fastening means forming the essence of the invention.

Figure 2 is an enlarged horizontal sectional view through the upper portion of the structure seen at the left in Figure 1, emphasizing the specific construction of the gate post accommodating and holding means.

Figure 3 is a fragmentary view, essentially in elevation disclosing the swivelly mounted, bodily adjustable gate post encircling a retaining latch or hook.

Figure 4 is an elevational view of Figure 3 observing it in the direction from right to left.

Figure 5 is an assembly view of the attaching screw.

Figure 6 is a fragmentary elevational view of the slotted horseshoe coupling unit.

Figure 7 is a detail view of said coupling or clip, the view being on an enlarged scale.

Calling attention now to the detailed parts of the improved fence and gate construction, attention is first invited to Figure 1. For convenience, one portion of the fence is indicated at A with the wires thereof being fastened to the post B. The complemental portion of the fence is denoted at the left at C and its post is indicated at D. It is my idea to extend the wires 8 from the fence section A beyond the post B and to attach a suitably weighted gate post 9 to the free ends thereof, the gate post being swingable in an obvious manner using the wires 8 as the hinge means. That is to say, the gate post is simply lifted up, swung in either direction to provide the gateway. Under the circumstances, an appropriate wire hoop 10 is fastened to the lower portion of the post B and extended therebeyond horizontally to serve as a stirrup or keeper for the lower end of the gate post 9. The gate post holding means cooperates with the keeper 10 to hold the post 9 in perpendicular gate-closing position.

This means is made up of several mutually cooperable parts. First, there is a wood screw, or the like, 11, threaded into the post at the desired elevation and stabilized by a retention collar 12 fastened in place by a retaining pin 13. The cylindrical projecting stem or shank portion 14 carries a cylindrical cross-head 15. This provides appropriate attaching means for the self-adapting coupling unit 16. This is of general horseshoe-shaped configuration and the ring-like portion thereof is formed with a horizontal slot 17 having an enlargement 18 at one end which may be defined as a keyhole slot. This permits the strap-like coupling 16 to be properly turned in relation to the retaining head 15 and then swivelly joined thereto to swing more or less in the desired universal manner, as indicated in Figure 3 for example. Between the free end portions 19 of the coupling member 16 is the gate post and bracing and retaining latch 20. The elongated end portion 21 functions as a handle and the hook portion 22 is adapted to partially embrace the gate post to hold it upright as shown more satisfactorily in Figure 2. The arcuate slotted end 23 is connected between the arms or terminals 19 by a suitable connecting pin 24.

It follows that we have a simple barbed wire style gate made up of the wires 8 and the post 9 with these features located between the existing stationary posts B and D, there being a hoop 10 at the bottom to accommodate the post 9, and manually manipulated retaining and fastening means at the upper end of the post 9. Hence, the gate post can be released from the latch and lifted up out of the keeper hoop 10 and swung open in either direction. When the gate is open the latch drops down to an out-of-the-way position as shown in Figures 3 and 4. When the gate is closed, the adapter coupling 16 swings up to horizontal position as shown in Figure 1, and the hook 22 embraces the gate post 9 as shown to advantage in Figure 2. The essential novelty is therefore exhibited in a clever structural adaptation in keeping with simple rural style gate and fence constructions.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structure of the class described, a fence post, a substantially universally mounted coupling member attached to the upper end of the fence post, a latch having a slotted hooked end pivotally attached to said coupling and adapted to embrace a gate post.

2. A fastener for a gate post comprising a headed screw adapted for attachment to a fence post, a coupling member having a keyhole slot swivelly and slidably connected to said headed screw, and a latch formed into a slotted hook at one end and slidably and pivotally connected with said coupling in the manner and for the purposes described.

3. In a fence and gate construction of the class described, a fence structure including a relatively fixed post, a relatively swingable gate structure including a companion post, said posts being disposed in close spaced parallelism, means attached to the lower end of the fence post with which the gate post is bodily disconnectible to hold said gate post partially in place, a headed fastener secured to the upper end of the fence post, a clevis swivelly connected with said headed fastener, and a gate post latch, said latch being provided at one end with a handle portion and at the opposite end with a hooked portion adapted to embrace the upper end of the gate post, the hooked end of said latch having pin and slot connection with said clevis in the manner and for the purposes described.

4. A fastener for a gate post comprising a substantially T-shaped member adapted for rigid attachment to a fence post, a clevis-type coupling member having detachable slotted connection with said T-shaped member, a substantially J-shaped latch formed into an elongated handle at one end, the opposite hook-shaped end being fastened to embrace a complemental gate post, and an elongated pin and slot connection between the bill portion of the hook and an adjacent portion of said coupling member.

5. In a structure of the class described, in combination, a relatively fixed fence post, a relatively movable and swingable gate post, said posts being disposed in close spaced perpendicular parallelism, means attached to the lower end of the fence post with which the gate post is bodily disconnectible to hold said gate post partially in place, a lever having a curved handle portion resting against the fence post, and provided at one end with a hook substantially embracing said gate post, a clevis, means adjustably connecting said clevis with the fence post, and a slidable pin and slot connection between the terminal portion of said hook and clevis in the manner and for the purposes described.

6. A fastener for a gate post of the class described comprising a relatively fixed attachment member adapted for attachment to a stationary fence post, a coupling member swivelly connected with said attachment member and including spaced parallel end portions, a latch freely movable in relation to said coupling member, said latch including an elongated shank portion constituting an operating handle, and being further provided with a hook at one end adapted to embrace a gate post, the free end portion of said hook being slotted and arranged for operation between the spaced parallel end portions of said coupling member, and a connecting and pivot pin extending through said end portion and through the slot in said hook to permit the hook to be slidably adjusted between said spaced parallel end portions in the manner and for the purposes described.

JAMES W. KAYSER.